Sept. 26, 1961 — R. A. ERICKSON ET AL — 3,001,252
FASTENING DEVICE
Filed March 11, 1958

INVENTORS
RITA A. ERICKSON
JOSEPH A. LaVALLEY
BY
ATTORNEYS

United States Patent Office 3,001,252
Patented Sept. 26, 1961

3,001,252
FASTENING DEVICE
Rita A. Erickson and Joseph A. La Valley, Baton Rouge, La.; said La Valley assignor to Southern Seating Corp., Baton Rouge, La., a corporation of Louisiana
Filed Mar. 11, 1958, Ser. No. 720,694
1 Claim. (Cl. 20—92.4)

This invention relates to a fastening device.

The device is one which is especially adapted to provide an efficient means for securely fastening structural elements used in the erection of temporary structures such as bleachers, grandstands, scaffolding, lean-to's, sheds, bins, silos and the like.

In the erection of such temporary structures and particularly bleachers, the nuts and bolts used to secure the seats and footboards to the understructure frequently become detached or lost necessitating delays in the assembly of the structure.

Further, the mechanical manipulations necessary to bolt and unbolt such structures are time consuming and increase the labor costs in connection with their erection and disassembly.

Still further in arrangements where the securing device forms an integral part of the structural element such devices project outwardly from the element and prevent efficient stacking and storage; in addition stacking frequently bends, breaks or otherwise damages the projecting securing device.

Accordingly, it is one of the objects of this invention to provide an efficient means for quickly, efficiently and securely fastening structural elements used in the erection of temporary structures such as bleachers without using nuts and bolts or similar small multi-part separable fastening means.

It is a further object of this invention to provide a fastening device which can be stored within the structural element when it is not being used as a fastener and when so stored it will not interfere with the efficient stacking and storage of the structural element and at the same time protect the fastening device against loss and damage.

Other advantages and objectives of our fastening device will appear from the accompanying specification and drawings.

In accordance with our invention the objectives are achieved by a fastening device which has a plunger mechanism that includes a body member and a latch element which can be aligned with the body member when in one position and be displaced therefrom when in a second position. Usually but not necessarily, the latch element is positioned at or near one end of the plunger. The plunger mechanism is positioned in an open ended channel or chamber and is free to move axially into and out of the channel. The channel preferably should be sufficiently long to permit the entire plunger mechanism to be confined in the channel when the latch element is aligned with the body of the plunger and the channel opening should be large enough to permit that portion of the plunger carrying the latch element to project outwardly therefrom while portions of the plunger body remain within the channel. Resilient means, for instance a spring, are interposed between reaction points on the plunger mechanism and on the channel wall, said means reacting between said points when the portion of the plunger mechanism carrying the latch element projects through the channel opening and thereby tending to retract the plunger into the channel.

For a fuller understanding of our invention reference is made to the accompanying drawings in which.

Figure 1:
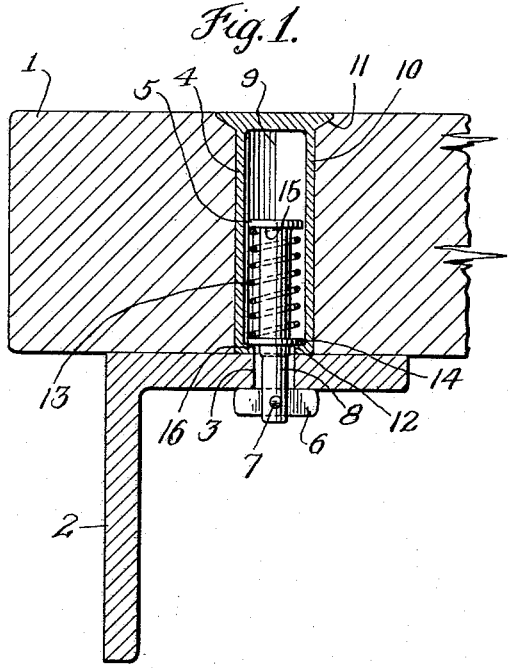
FIG. 1 is a cross-sectional view illustrating the device in the fastening position to secure a bleacher seatboard or footboard to the supporting understructure.
Figure 2:
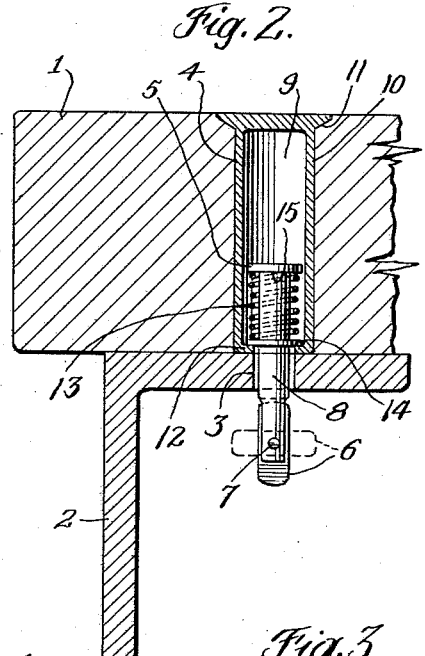
FIG. 2 is a similar sectional view illustrating the toggle mechanism or pin pulled down to a position to permit dog-earing or activating the T-head piece of the toggle.
Figure 3:
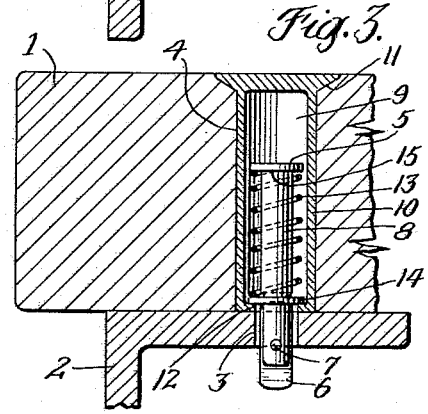
FIG. 3 is also a similar sectional view but it shows the toggle mechanism released and the board ready for removal and stacking. This view also illustrates the positioning of the toggle mechanism during the assembly of the structure just prior to the operation illustrated in FIG. 2.

Referring to FIGS. 1–3 of the drawings which illustrate a preferred embodiment of the fastening device of the invention being used to secure a bleacher seat board 1 to the supporting understructure 2.

As is there illustrated, the fastening device 4 is a T-head toggle mechanism 5 in which the headpiece 6 is mounted on a pivot 7 at one end of the toggle body member 8. The headpiece can be rotated about the pivot and thereby brought into and out of alignment with the body portion. Various other types of latching elements which can be brought into and out of alignment with a body member can be employed in lieu of T-head toggles.

The toggle is positioned in a channel forming member. In the preferred embodiment as illustrated the channel 9 is formed by a metal tube 10 preferably, but not necessarily, fitted with a flanged head 11. The channel member is securely fitted in a hole running through the thickness of the seatboard 1, as for example by press fitting or the like. It is preferred to have the head flush with the surface or recessed into the board so that it will not project from the surface and interfere with the stacking and storage of the boards when not in use.

Since the channel is intended to act as a receptacle for the inactivated toggle, a mere hole in the structural element is considered to be a channel forming member as that term is used herein.

Figure 4:
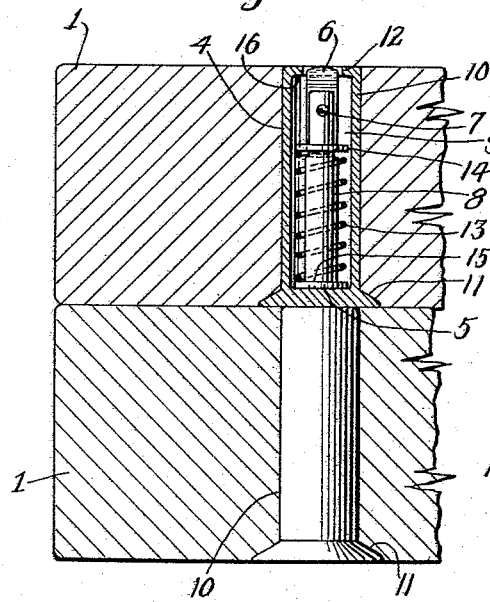
FIG. 4 illustrates two boards in position for stacking and storage, the boards have been inverted and the toggle mechanism has dropped into the channel or chamber.

As can be seen in FIG. 4 the channel is sufficiently long to receive and store the full length of the toggle mechanism when the headpiece is aligned with the toggle body.

In the embodiment illustrated the channel member 9 is a closed ended tube. However, the channel can be open or closed at the head end as desired. We prefer, especially for use in seatboards or other horizontally assembled units, to fully close the upper channel end in order to prevent water from entering the channel when the fastener is in use. (Herein when we refer to the upper or lower portion of the channel we are viewing the channel positioned as shown in FIGS. 1, 2 and 3.)

The channel is provided with an opening 12 which leads to a face of the structural element, for example the underside of the seatboard. This opening is sufficiently large to permit the toggle mechanism to pass through the opening a sufficient distance to permit the headpiece 6 to pass through an aligned hole 3 in the supporting understructure 2 and turned on its pivot so as to permit the T-head to engage the underside of the supporting structure all as shown in FIGS. 1–3 inclusive.

While it is preferred to provide the channel of sufficient length to receive the entire toggle mechanism as shown in FIG. 4, where the structural elements are to be stored in stacks, nevertheless it is possible to employ a shorter channel in those structures where projection of the inactivated toggle does not constitute an objectionable feature.

Because of the tendency of the headpiece to tilt on its pivot when the channel is in the upside-down position shown in FIG. 4, it is advisable to provide means which will minimize the effect of the headpiece tilting. This can be done in various ways—one way to minimize the effect of this tilting is to dimension the channel so that it is the same length as the overall length of the toggle mechanism when the headpiece is aligned with the body and have the headpiece positioned in a hole of smaller size than the channel. Two different ways of locking the headpiece are illustrated in FIG. 4. The channel opening 12 is smaller than the cross-sectional area of the channel and tilting of the headpiece 6 will be arrested by the walls of this opening. FIG. 4 also shows that the relaxed spring 13 and headplate 14, which will be referred to more fully subsequently, can be used, provided a properly sized spring is employed, to position the head plate 14 so as to lock the headpiece in position and prevent its tilting.

Flexible or resilient means, such as, for example, the spring 13, are interposed between points of reaction on the toggle body and in the channel. Where a spiral spring surrounding the toggle is employed, the toggle can be provided with an enlarged head 15 which will act as a reaction point for the spring. In such cases, it is also desirable to provide the spring with a headplate 14 at its other end in order to insure obtaining more uniform spring action.

Various types of spring reaction points can be employed in the channel, for example, restricting the channel cross-sectional dimensions at any desired point and thereby providing a shoulder which will engage the headplate 14. In FIG. 4 it is accomplished by the shoulder 16. A variation is illustrated in FIG. 6 by the threaded washer 17 which will be discussed further hereinafter.

When the seat or foot-boards are stored they are in stacked position as shown in FIG. 4. With the bottom side up and the toggle mechanism fully retracted in the channel. When the board is turned right side up the toggle mechanism will slide in the channel and the headpiece 6 will project through the opening 12 sufficiently to permit aligning and passing it part way through a hole 3 in the supporting understructure 2 as in FIG. 3. The toggle is then pulled down against the spring to the position shown in FIG. 2 and the headpiece 6 is pivoted to a position where it can engage the underside of the supporting structure. The spring 13 will then retract the toggle into the channel and secure the board to the understructure as shown in FIG. 1.

To disassemble the structure the reverse procedure (going from FIG. 1 to FIG. 4) is followed and when the board is inverted as in FIG. 4, the toggle mechanism will drop into the channel and relax the spring. By proper sizing of the various elements it is possible to have the spring retract part of the headpiece into the channel opening when going from the step illustrated in FIG. 2 to the step shown in FIG. 3. If this is done then after inverting the board to the FIG. 4 position will not involve the danger of dog-earing or tilting the T-head and this will permit the toggle to automatically drop into the channel, thus facilitating faster stacking.

Figure 5:
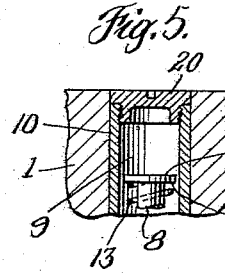
FIGS. 5 and 6 show alternative forms of the invention illustrated in FIGS. 1–4.
Figure 6:
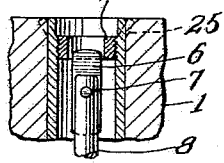

FIGS. 5 and 6 illustrate some advantageous alternative embodiments which permit ready access to the channel member so as to replace the spring or effect servicing of other parts.

By employing a threaded cap member 20 as shown in FIG. 5, in lieu of the solid, flanged head shown in FIG. 1, ready access can be had to the channel for servicing the mechanism.

Similarly, as shown in FIG. 6, the channel opening can be internally threaded and a correspondingly threaded washer plate 17 can be employed to provide the spring reaction point on the channel wall. Such an arrangement has still other advantages. For example, spring tension can be easily varied by shifting the position of the plate 17. Also, where the channel tube has a flanged head 11 as shown in FIG. 6, the modification shown in FIG. 6 will permit providing a flanged seat on the underside, in addition to the top side, by outwardly opening the tube ends to the dotted line position 25 as shown in FIG. 6, thus insuring permanency of the installation in the board—yet still permitting ready access for servicing.

The foregoing description and drawings are merely illustrative of our invention and the invention should not be considered to be limited to the illustrative embodiments.

We claim:

A grandstand comprising in combination an understructure and boards, said boards provided with a device adapted to fasten the boards to the understructure and further adapted to be stored within said boards when not in use as a fastener, said device comprising a T-head toggle mechanism including a body member having at one end thereof a pivoted head piece which can be aligned with the body members when in one position on the pivot and adapted to form a T-head when displaced to a second position on said pivot, a channel in said board leading to the plane of the board to be presented to the understructure, said channel being of a length which will permit the entire toggle mechanism to be received within the board when the head piece is aligned with the body members and having an opening at one end thereof through which the end of the toggle mechanism carrying the head piece can project when the board is in position to be fastened to the understructure, resilient means interposed between reaction points on the toggle body and on the channel wall, said resilient means being uncompressed when the entire toggle mechanism is positioned within the channel and also when the toggle projects outwardly through the channel opening sufficiently far to permit the leading end of the aligned head piece to pass through and partially project from a hole in the understructure, said resilient means tending to react between said reaction points to retract the toggle into the channel when the head piece projects outwardly from the hole in the understructure a distance which will permit the head piece to be displaced from the toggle body to form a T-head abutting and acting against the face of the understructure which is away from the understructure face which is in contact with the board channel opening, and means to prevent tilting of the head piece from alignment with the toggle body when the entire toggle mechanism is positioned in the channel said means comprising a cross sectional restriction of the channel wall in the area adjacent that occupied by the head piece when the entire toggle mechanism is within the channel.

References Cited in the file of this patent

UNITED STATES PATENTS

| | | |
|---|---|---|
| 325,221 | Wright | Aug. 25, 1885 |
| 748,078 | Kaisling | Dec. 29, 1903 |
| 1,194,902 | Urban | Aug. 15, 1916 |
| 1,639,661 | Newcomb | Aug. 23, 1927 |
| 1,715,885 | Annand | June 4, 1929 |
| 1,875,115 | Oberdorfer | Aug. 30, 1932 |
| 2,018,346 | Busby | Oct. 22, 1935 |
| 2,246,834 | Bowman | June 24, 1941 |
| 2,831,520 | Clarke | April 22, 1958 |

FOREIGN PATENTS

| | | |
|---|---|---|
| 765,438 | Great Britain | Jan. 9, 1957 |